(12) United States Patent
Lasse et al.

(10) Patent No.: US 7,435,167 B2
(45) Date of Patent: Oct. 14, 2008

(54) APPARATUS AND METHOD FOR TRANSFERRING LEG QUARTER FROM SHACKLE

(75) Inventors: Kelvin D. Lasse, Springdale, AR (US); Charley Reed, Tontitown, AR (US); Tim Reddell, Bentonville, AR (US); James Ruff, Farmington, AR (US)

(73) Assignee: Tyson Foods, Inc., Springdale, AR (US)

( * ) Notice: Subject to any disclaimer, the term of this patent is extended or adjusted under 35 U.S.C. 154(b) by 97 days.

(21) Appl. No.: 11/627,365

(22) Filed: Jan. 25, 2007

(65) Prior Publication Data

US 2008/0182497 A1 Jul. 31, 2008

(51) Int. Cl.
*A22B 7/00* (2006.01)

(52) U.S. Cl. ...................................... 452/182

(58) Field of Classification Search .................... 452/52, 452/53, 71, 106–109, 125, 127, 149, 182, 452/183
See application file for complete search history.

(56) References Cited

U.S. PATENT DOCUMENTS

| 3,708,829 | A | * | 1/1973 | Klevgard | 452/183 |
| 4,178,659 | A | * | 12/1979 | Simonds | 452/182 |
| 4,616,381 | A | * | 10/1986 | Harris, Jr. | 452/110 |
| 4,689,855 | A | * | 9/1987 | Dameron | 452/177 |
| 5,080,632 | A | | 1/1992 | Clifford | |
| 5,306,203 | A | | 4/1994 | Martin et al. | |
| 5,344,360 | A | | 9/1994 | Hazenbroek | |
| 5,453,045 | A | | 9/1995 | Hobbel et al. | |
| 5,632,671 | A | * | 5/1997 | Ochylski | 452/128 |
| 5,672,099 | A | * | 9/1997 | Takamagari et al. | 452/187 |
| 5,875,738 | A | | 3/1999 | Hazenbroek et al. | |
| 6,033,299 | A | | 3/2000 | Stone et al. | |
| 6,283,848 | B1 | | 9/2001 | Berry | |
| 6,623,346 | B2 | | 9/2003 | Lee | |
| 6,749,497 | B2 | | 6/2004 | Haley et al. | |
| 6,905,404 | B2 | | 6/2005 | Steffler et al. | |

* cited by examiner

*Primary Examiner*—Thomas Price
(74) *Attorney, Agent, or Firm*—Mark E. Stallion, Esq.; Husch Blackwell Sanders LLP

(57) ABSTRACT

Mechanical assembly comprising a roller chain mounted on multiple sprockets attached via shafts and bearings to a frame. Multiple unloader shackles are attached to the roller chain such that all shackles are aligned in a consistent manner. The roller chain assembly is mounted in such a way as to align it longitudinally with an overhead shackle-line. It is mounted in such a way as to allow the individual unloader shackles to align directly opposite the individual overhead shackles at a specific offset distance and travel in the same direction as the overhead shackles. It is also mounted in such a way as to allow the attached shackles to rise in elevation from beneath the overhead shackles as they travel in the same direction as the overhead shackles. The chain is driven at a rate which synchronizes the attached unloader shackles with the overhead shackle-line to which it is aligned in order to transfer a carcass such as a leg quarter.

20 Claims, 4 Drawing Sheets

APPARATUS AND METHOD FOR TRANSFERRING LEG QUARTER FROM SHACKLE

BACKGROUND OF INVENTION

1. Field of Invention

This invention relates generally to processing protein products and, more particularly, to poultry conveying equipment.

2. Background Art

It is a common in the poultry processing industry to transport poultry carcasses, such as for example chicken carcasses, on an apparatus known as a shackle conveyor which typically involves an endless conveyor chain at an elevated height from which are suspended a plurality of shackles aligned and evenly spaced apart. The shackles typically are formed from a metal rod and have a pair of U-shaped depending portions large enough to receive the chicken leg bones and small enough to keep the hocks of the chicken legs from passing through, thereby providing a temporary holder for a chicken carcass or leg portion suspended upside-down there from. The entire carcass can be suspended from said shackles or some portion of the shackles such as for example the leg quarters, or for example what is sometimes referred to as the saddle portion of the carcass.

In the processing of chickens, turkeys, and other types of birds through a poultry processing plant for defeathering, evisceration, cut-up and packaging, it is desirable to perform as many of the processing steps as possible with automated machinery. It is important to minimize the manual handling of the birds so as to minimize the expense of processing, as well as to ensure uniform processing of the birds. The general method in the poultry processing industry is to suspend birds by their legs from an overhead conveyor system as described above and perform as many of the processing steps as possible as the birds are being moved aligned in series and evenly space apart on the conveyor system from one processing station to the next.

For example, the birds can be decapitated, opened and eviscerated while being progressively advanced along a single overhead conveyor system. However, at certain points in the conveyor system, it may be desirable to transfer the birds from one conveyor line to another. For example, after the birds have been eviscerated, it may be necessary to transfer the birds from the evisceration conveyor line to another processing line, thus necessitating the need to transfer the birds from one conveyor line to another.

In the past, the transfer of birds from one conveyor line to another was manually performed by an operator removing the birds from the shackles and placing the legs of the birds or the entire carcass onto another processing line. More recently, equipment has been developed for automating this transfer process. However, many of these machines are complicated and do not provide a simple and efficient means for transferring the birds. Accordingly, a need exists for an improved apparatus and method for automatically transferring birds from one overhead conveyor system to another processing line.

As discussed above, some operations can be performed on the chicken carcass while it is suspended on the shackle of a shackle conveyor, but certain other processes are performed by machines or by the aid of machines which require that a portion of the carcass, for example the legs and saddle, be conveyed down a separate conveyor. It has been customary to employ hand labor to transfer the chicken carcass portions from a shackle conveyor. The typical machines that have been designed for this purpose do not provide a simple and reliable method to successfully automate this transfer, for example the saddle and legs portion of the chicken carcass, from the shackle conveyor to a separate conveyor or processing line with the carcass accurately located and oriented as required to properly carry out further operations.

There is a need to unload chicken leg quarters from a moving overhead shackle line in such a way as to maintain control of the individual leg quarters in two specific aspects: time and space ("Time" in terms of being able to specifically ascertain the location of the product at a given periodic point in time. "Space" in terms of physically capturing and mechanically restraining them in a particular and specific orientation and location in three dimensional space.). The need is particularly evidenced by the requirement to individually load and orient the chicken leg quarters in the specified packaging container.

Previous efforts include for example: an attempt to maintain desired product control by means of a specific arrangement of guide bars only, with no specific mechanical means of moving the product other than the existing shackle line itself and relying solely upon gravity to move the product in the desired direction; slotted wheels that attempt to rotate in such a manner to align slots in the wheel with the leg hocks; and actuated plates, levers or rods for lifting the hock out of the shackle.

For example, current products and methods employed to unload chicken leg quarters from a moving overhead shackle line include standard fixed guide-rail unloaders designed to lift the hock out of the shackle constraint as it passes by, after which the chicken leg quarter drops by force of gravity into a subsequent delivery mechanism such as a conveyor or a hopper/slide.

Previous efforts suffered from the following shortcomings: inconsistency of basic functionality due to varying bird size, inconsistency of product orientation and location due to lack of specific, intentional mechanized means of locomotion & reliance on the force of gravity, and a tendency for the product to fall free from the guide bar mechanism, again due to variations in bird size. Shortcomings of known art include: lack of controlling functionality (control in terms of physically capturing and mechanically restraining the product in a particular and specific orientation and location in three dimensional space and in terms of ascertaining the location of the product at a given periodic point in time.). A better transfer system is needed.

BRIEF SUMMARY OF INVENTION

The present invention is an apparatus and method the deals with the above outlined problems in a very effective manner by lifting the hocks out of the shackle loop and disposing the legs in respective unloader shackles with the hock captured in the slot of the unloader shackle and thereafter engaging the carcass with guide rails to orient the carcass in an appropriate position for effective transfer. The present system also provides for unloading carcasses from a shackle conveyor sequentially onto a separate conveyor or processing line. The description of the invention herein for illustration purposes primarily recites examples where leg quarters are the work product but the present invention can be utilized for other portions of the carcass where the legs are attached such as for example the saddle portion or the entire carcass.

The full function performed by the apparatus of the present invention is not accomplished by prior devices. Prior devices have been known that mechanically lift the hocks of a chicken carcass out of the shackles of a shackle conveyor and let them drop on a belt conveyor or other receiving means. However, such devices do not control the orientation of the chicken carcass and would be quite unsuitable for the function performed by the leg transfer apparatus of the present invention.

In addition to providing the above features and advantages, it is an object of the present invention to provide a leg transfer machine for removing a portion of a chicken carcass from a shackle conveyor in a controlled manner and reorienting the carcass in a proper manner to be received for the next operation. It is another object of the present invention to provide a leg transfer machine for removing chicken carcasses or parts thereof from a shackle conveyor while a shackle is in motion.

Advantages over known art include: the ability for control in terms of physically capturing and mechanically restraining the product in a particular and specific orientation and location in three dimensional space and in terms of ascertaining the location of the product at a given periodic point in time. It is able to unload a chicken leg quarter from a moving shackle line and keep control of it until a specific drop point when & where it can be consistently released (in period of time, location and orientation of product.)

One embodiment of the present invention comprises a mechanical assembly further comprising a roller chain mounted on multiple sprockets attached via shafts and bearings to a frame. Multiple unloader shackles are attached to the roller chain such that all shackles are aligned in a consistent manner and evenly spaced apart. The chain assembly is mounted in such a way as to align it longitudinally with an overhead shackle-line. It is mounted in such a way as to allow the individual unloader shackles to align directly opposite the individual overhead shackles at a specific offset distance and travel in the same direction as the overhead shackles. It is also mounted in such a way as to allow the attached shackles to rise in elevation from beneath the overhead shackles as they travel in the same direction as the overhead shackles. The chain is driven at a rate which synchronizes the attached unloader shackles with the overhead shackle-line to which it is aligned.

Guide railing can also be employed to facilitate a clean transfer and to achieve the proper orientation. A guide rail can be utilized to raise and align the leg quarters as they approach the apparatus, while still secured within the overhead shackles such that they are presented to the unloader shackles in an orientation that allows them to enter and mount upon the unloader shackles from above as said unloader shackles rise in elevation. Additional guide railing can be employed to aid and assist in both seating the leg quarters into the unloader shackles as they rise up from beneath, and in holding said leg quarters in the unloader shackles as they proceed through their route of operation until the point is reached where it is intended that the leg quarters be removed from the unloader shackles. Additional guide railing can also be employed to aid in removing the leg quarters from the unloader shackles at the point of desired removal. Force of gravity is intended to be the primary means of removal, and said guide railing is meant only to assist and assure the unloading and removal of the chicken leg quarters from the unloader shackles. Additional guide railing can also be employed to control the overhead shackles as they travel down the line: both to keep them from swinging either toward or away from the unloader assembly during the unloading portion of their travel route, and also to intentionally swing them away from the unloader unit at the specific point of release of the chicken leg quarter from the overhead shackle line.

All such guide railing can be mounted directly to either the unloader assembly or to the overhead shackle line with a mounting apparatus that can provide full adjustability. The guide railing can cause the carcass to swing either toward or away from the unloader assembly during the unloading portion of their travel route, and can also intentionally swing them away from the unloader unit at the specific point of release of the chicken leg quarter from the overhead shackle line.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
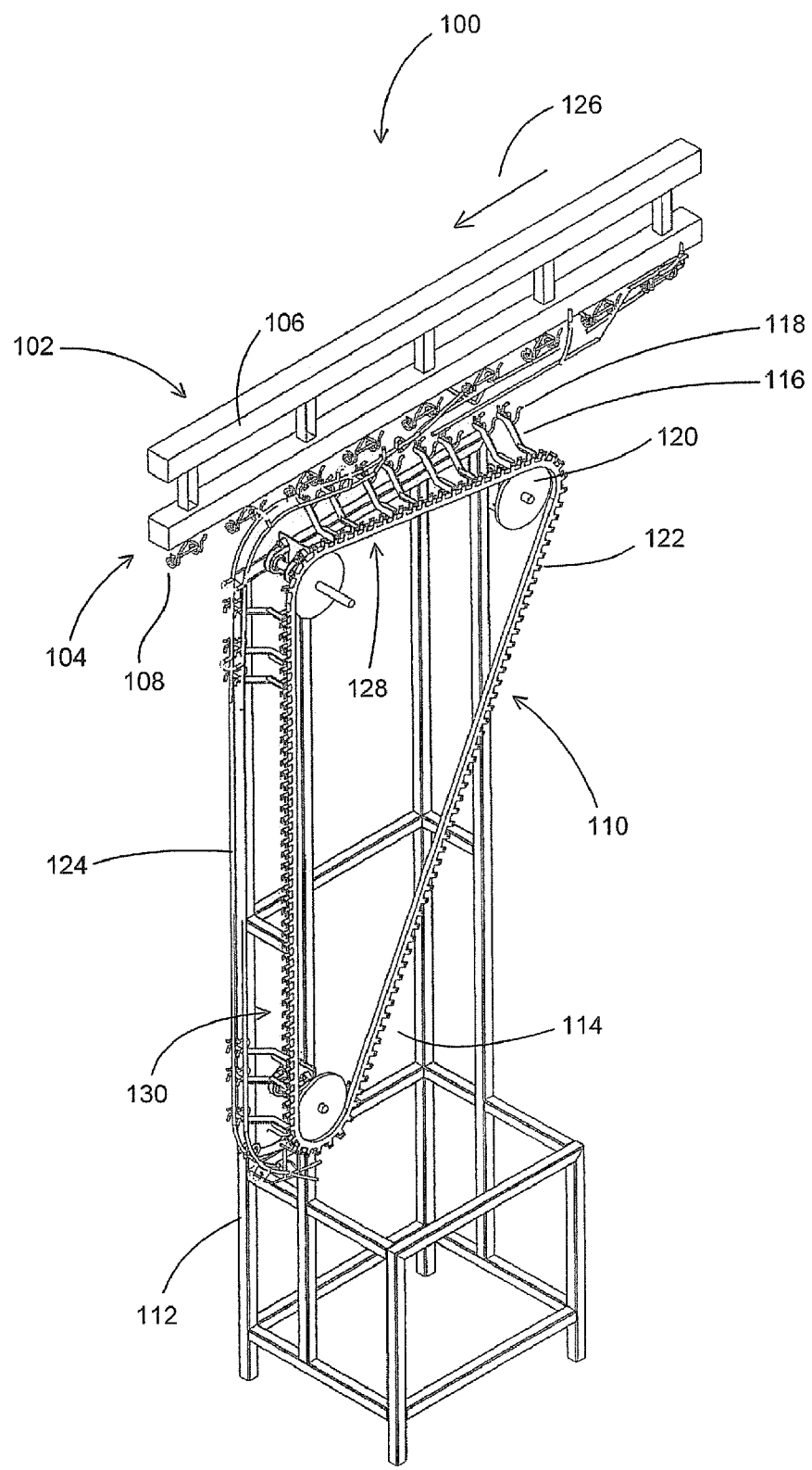
FIG. 1 is a perspective view of the unloader chain assembly and overhead shackle conveyor.

According to the embodiment(s) of the present invention, various views are illustrated in FIG. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising an endless roller chain driven on sprockets having a plurality of unloader shackles evenly spaced and attached thereto and aligned with an overhead shackle conveyor teaches a novel apparatus and method for unloading leg quarters from a shackle conveyor. One embodiment of the present invention comprises a mechanical assembly further comprising a roller chain mounted on multiple sprockets attached via shafts and bearings to a frame. Multiple unloader shackles can be attached to the roller chain such that all shackles are aligned in a consistent manner and evenly spaced apart. The chain assembly can be mounted in such a way as to align the unloader shackles longitudinally with an overhead shackle-line. It is mounted in such a way as to allow the individual unloader shackles to align directly opposite the individual overhead shackles at a specific offset distance and travel in the same direction along the top run as the overhead shackles. It can also be mounted in such a way as to allow the attached unloader shackles to rise in elevation from beneath the overhead shackles as they travel in the same direction as the overhead shackles along the top run where the top run has an upward slot along the path of conveyance. The chain can be driven at a rate which synchronizes the attached unloader shackles with the overhead shackles to which it is aligned.

The details of the invention and various embodiments can be better understood by referring to the figures of the drawing. Referring to FIG. 1, an unloader station 100 is shown. The unloader station 100 includes an overhead shackle conveyor assembly 102 which is operable to carry and convey poultry carcasses to various processing stations including the unloader station 100. The overhead shackle conveyor assembly 102 includes a shackle conveyor frame 106 which supports the shackle conveyor 104. The shackle conveyor can be an in-line conveyor chain that is driven by a power source to convey in-line shackles 108 that are evenly spaced apart as they are conveyed along the conveyor line. The hock of the leg quarters can be hung in the shackles and suspended as they are conveyed along a path of conveyance as indicated by directional arrow 126.

The unloader assembly 110 can be positioned adjacent and under the overhead shackle conveyor assembly 102. The unloader assembly 110 can include an unloader assembly frame 112 which supports the unloader roller chain assembly 114. The unloader roller chain assembly 114 can include an endless roller chain 122 that travels over a plurality of sprockets for example sprocket 120 thereby forming an endless unloader conveyor for lifting and removing the leg quarters from the shackles 108. The unloader chain roller assembly 114 also includes unloader members 116 which are attached to the endless roller chain 122 and evenly spaced apart such that the spacing between the unloader members 116 are substantially the same as the spacing between the shackles 108. At a distal end of the unloader member 116 there can be a pair of lifters or unloader shackles 118 where each of the unloader shackles has a recessed area such as, for example, a U-shaped recess for receiving the hocks of the leg quarters. The U-shaped lifters or unloader shackles can be, for example, a U-shaped rod member having a curvature and recess optimal for receiving and lifting the hock of a leg quarter where the opening of the recess is sufficiently small such that the hock cannot completely travel therethrough while having a top opening to receive the leg portion just above the hock similar to that of the shackle 108.

The endless roller chain 122 can travel along an endless path where the path lies in a plain that is substantially parallel to the path of conveyance 126. The endless roller chain can have a top run 128 that travels substantially in the same direction along the path of conveyance 126. The endless roller chain 122 can be positioned in such a way to align it longitudinally with the path of conveyance 126 of the overhead shackle line. The roller chain can be mounted in such a way to allow the individual unloader shackles mounted thereon to align directly opposite and below the individual overhead shackles 108 at a specific offset distance and travel in the same longitudinal direction along the top run as does the overhead shackles.

The roller chain can also be mounted in such a way that the top run of the roller chain rises in elevation along the path of conveyance such that it rises from beneath the overhead shackles as they travel in the same direction such that the unloader shackles capture lift upward on the hock of the leg quarter such that the hock is removed from the shackle and is captured in the unloader shackle. Once the hock of the leg quarter is captured in the unloader shackle 118, the unloader roller chain assembly 114 conveys the leg quarter downward along the bottom run 130. As the leg quarter is conveyed to the lower-most area of the unloader roller chain assembly, the leg quarter can be released and deposited in a position for subsequent processing. As the leg quarter is being conveyed along the bottom run, it can be conveyed downward while being seated and positionally controlled with the assistance of the guild rail assembly.

Figure 2:
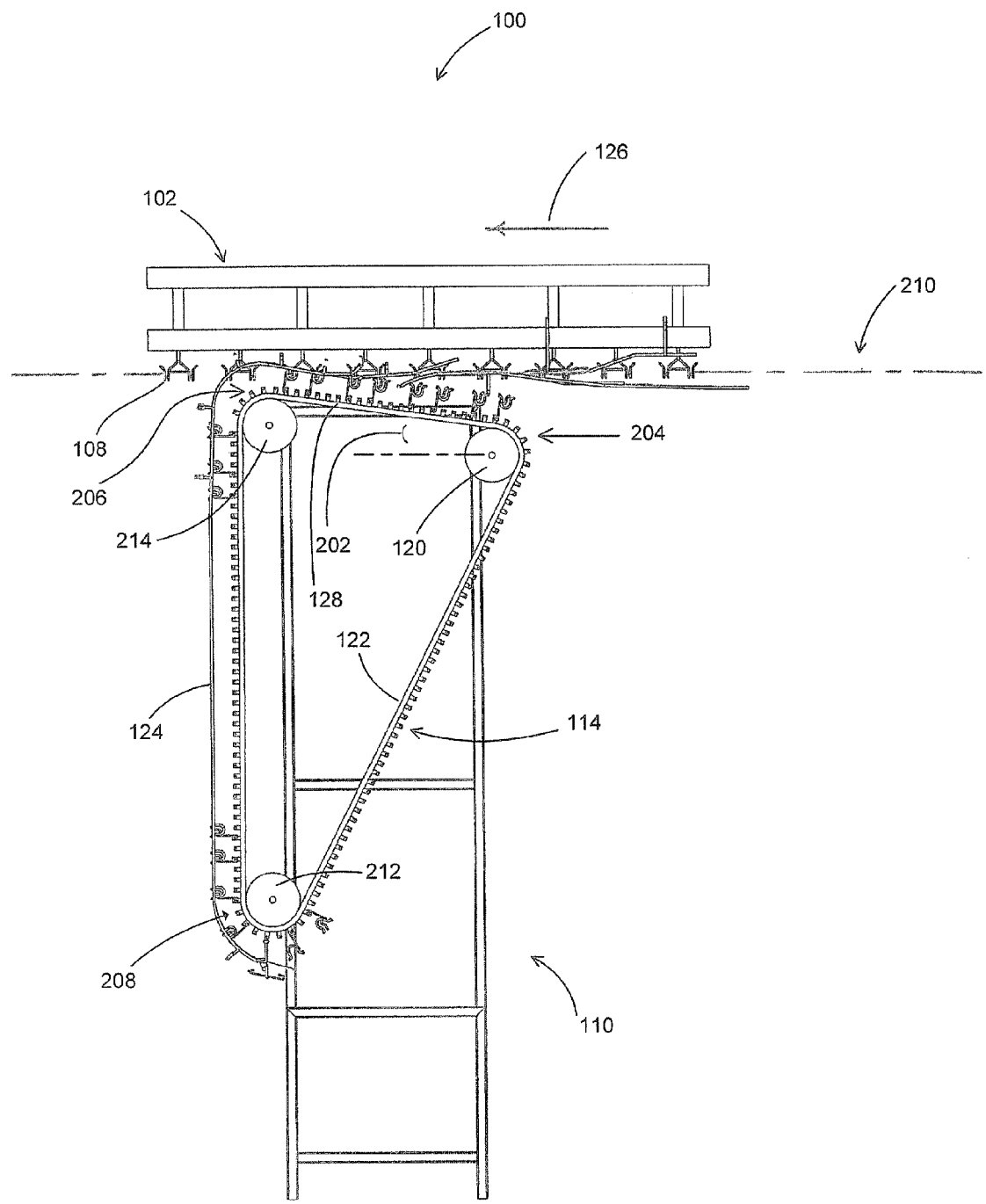
FIG. 2 is a front plan view of the unloader chain assembly and overhead shackle conveyor.

Referring to FIG. 2, a front plan view of the unloader chain assembly and overhead shackle conveyor system is shown. The front view of the unloader station 100 reveals the endless roller chain 122 which travels about the sprockets 214, 120 and 208. The roller chain is shown in this embodiment can travel about 3 sprockets forming a triangular pattern. The top run 128 of the roller chain travels along a roller path adjacent to and parallel to the path of conveyance 126 of the overhead shackle conveyor assembly. The top sprockets 120 and 214 are shown spaced apart creating the top run 128 of the roller chain. The sprocket 214 is shown downstream along the path of conveyance from sprocket 120. Sprocket 214 is also shown at a higher elevation than sprocket 120 creating a slightly upward grade along the path of the top run. The downstream portion 206 of the top run is therefore at a higher elevation than the upstream portion 204 of the top run.

This gradual upward grade of the top run allows the unloader shackles to raise in elevation thereby making contact with the leg quarters and lifting upward on the hocks of the leg quarters thereby removing the hocks from the shackles 108. The upward grade can have an angle 202 with respect to horizontal. The angle 202 can optimally be from about approximately 2 degrees to about approximately 45 degrees. The unloader shackles will capture the leg quarters and convey them downward through the guild rail assembly 124 to the bottom most portion 138 of the bottom run where the leg quarter can be discharged for further processing. As the unloader members transverse downstream along the path of conveyance from the upstream portion of the top run to the downstream portion of the top run, the unloader members rise from below the hock line 210 to above the hock line to engage the leg quarters in the hock area of the leg quarter thereby lifting and removing the leg quarter from the overhead conveyor. The hock line 140 is an imaginary line defining the approximate elevation of the hocks of the leg quarters as they are conveyed in the overhead shackles along the path of conveyance. The hock line can be defined for example by a line defined by the lower most portions of the overhead shackle, which is the approximately elevation of a hock when captured in the overhead shackle.

The unloader member can be attached to the roller chain and extend to a distal end of the unloader member toward the hock line. Attached on the distal end of the unloader member can be the unloader shackle, which can be a U-shaped shackle with an open end for receiving the portion of the leg quarter above the hock, while having a recessed area or convex stirrup or clevis that is sufficiently narrow to not let the hock pass there through. When the leg portion above the hock is received through the open end, it rests in the convex stirrup or clevis area while retaining the hock by being sufficient small to not allow the hock to pass therethrough.

Figure 3:
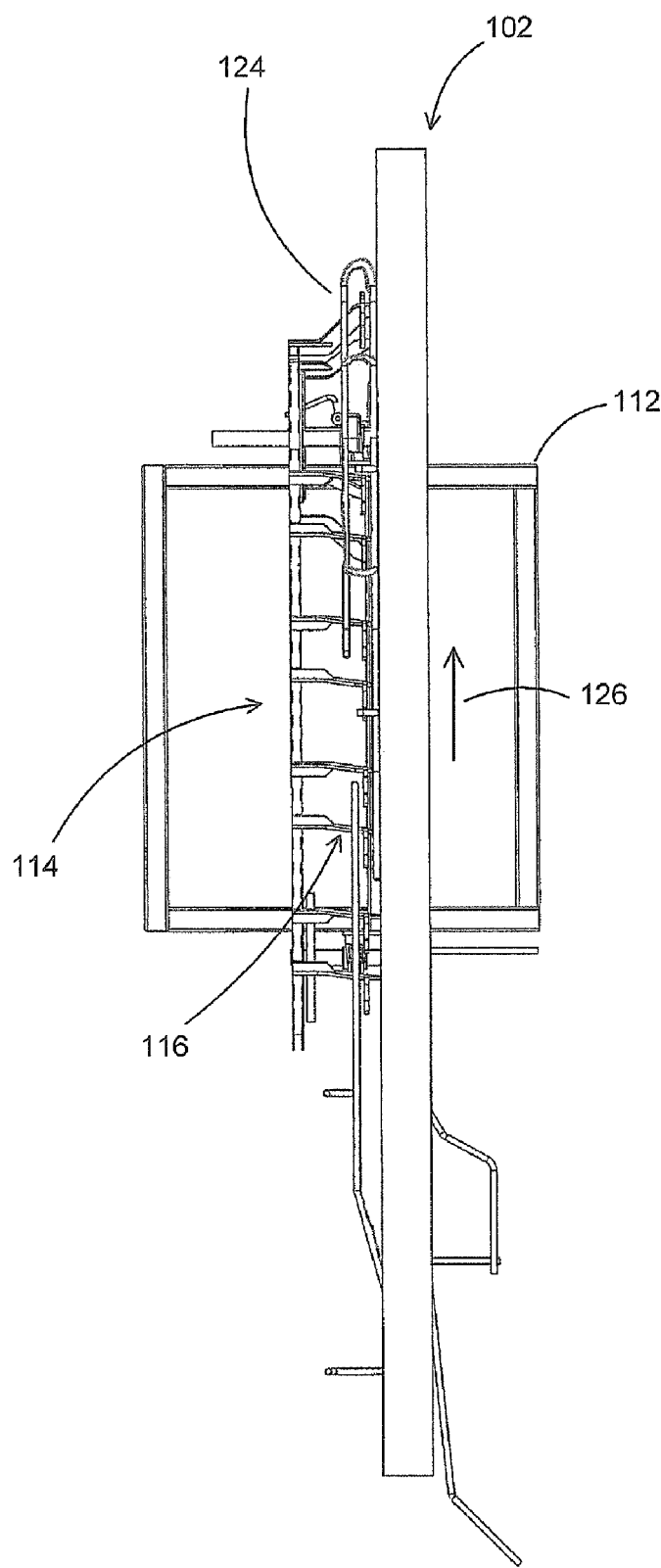
FIG. 3 is a top plan view of the unloader chain assembly and overhead shackle conveyor.

Referring to FIG. 3, a top plan view of the unloader chain assembly and overhead shackle conveyor is shown. FIG. 3 reveals the top perspective of the unloader station 100 which shows the respective lateral positions of the unloader roller chain assembly 114 and the overhead shackle conveyor assembly 102. The respective positions of the unloader assembly frame 112 and the guild rail assembly 124 is shown. The unloader members 116 are shown extending upward and laterally toward the overhead shackles 108 not shown in this view, and positioned in such a manner to affect the exchange from the overhead shackle to the unloader shackle. The top view also reveals that the path of conveyance 126 is substantially parallel to the top run of the unloader assembly 110.

Figure 4:
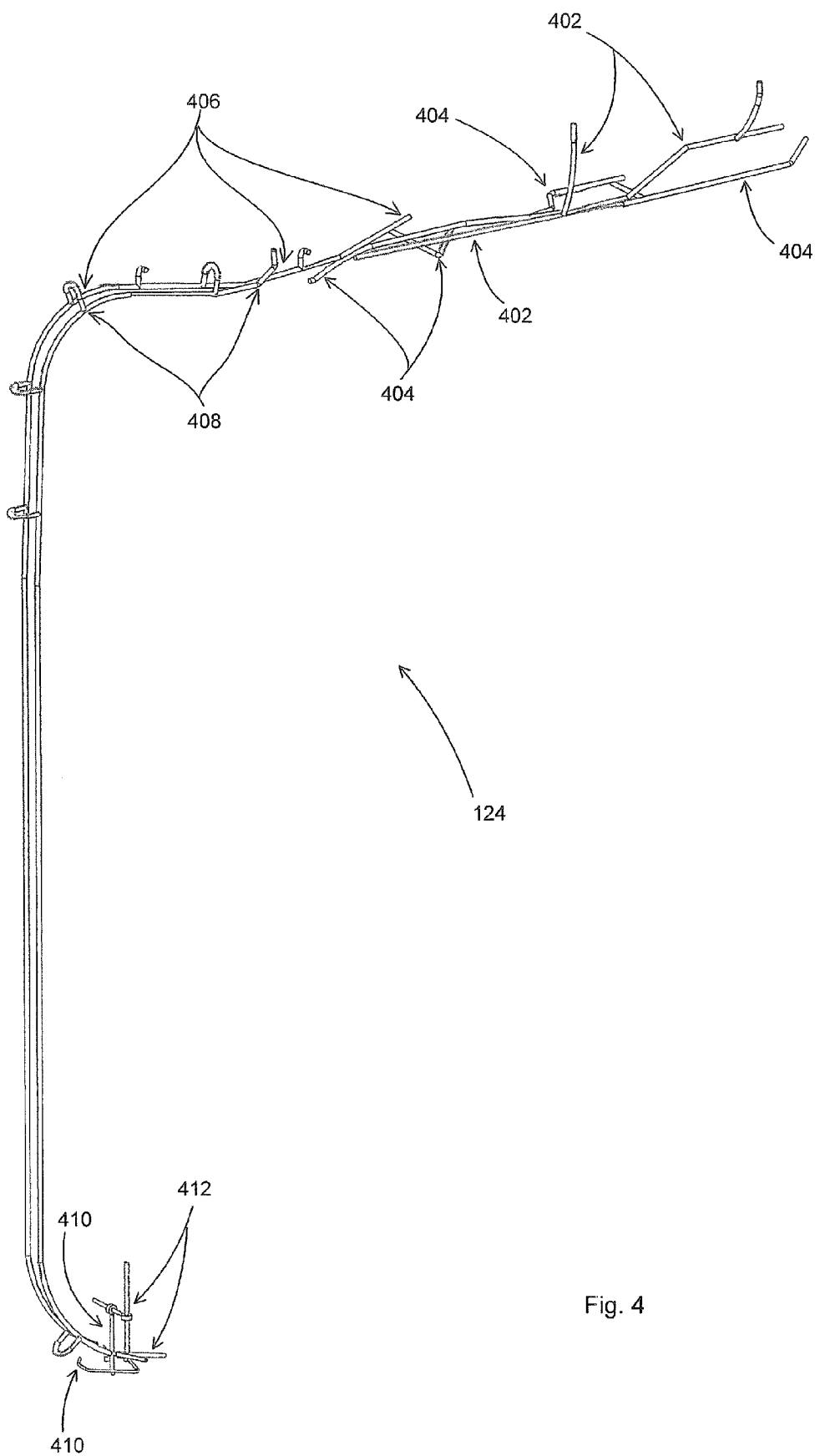
FIG. 4 is a perspective view of the guide rail assembly.

Referring to FIG. 4, a perspective view of the guide rail assembly is shown. FIG. 4 shows the guide rail assembly, which facilitates a clean transfer from the overhead shackle to the unloader shackle. The approach railing also helps to orient the leg quarter in a manner that the transfer is facilitated. The guide rail can be utilized to raise and align the leg quarters as they approach the apparatus while still secured within the overhead shackles such that the leg quarters are presented to the unloader shackles with the proper orientation that allows the leg quarter to enter an amount upon the unloader shackles. The guide rail assembly can also assist in lifting and seating the leg quarter in the unloader shackle and ultimately assist in discharging the leg quarter from the unloader shackle.

The Lead-In Guide portion 402 of the guide rail assembly can be used to orient the leg quarter as it approaches so that it can be properly aligned and seated in the unloader shackle. A Leg Lift Guide portion 404 of the guide rail assembly can assist in lifting the leg quarter out of the overhead shackle by urging the leg quarter upward so that the leg quarter can be captured and seated in the unloader shackle. FIG. 4 also shows a seating guide rail portion 406 employed to aid and assist in both seating the portion of leg quarters above the hock into the unloader shackles as they rise and to hold the leg quarters in the unloader shackle as they proceed through the unloader operation until the point is reached where it is intended that the leg quarters are removed from the unloader shackles. This portion 406 can urge the leg quarter toward the unloader shackle. The Control Guide portion 408 of the assembly 124 can assist in controlling the position of the leg quarter so that it does not swing out of alignment causing the leg to become unseated.

A view of the removal railing portion is shown, which includes a Stop Guide portion 410 and an unload guide 412. The removal railing portion can be employed to aid in the removing of the leg quarter from the unloader shackle at a point that is desired for removal such as, for example, the bottom-most portion 138 of the bottom run. The removal railing can engage the leg quarter to stop and urge the leg quarter hock out of the recessed area of the unloader shackle.

The control railing can also be employed to control the overhead shackles as they are conveyed along the path of conveyance such that the control railing keeps the shackles from swinging toward or away from the unloader assembly. Shackle control railing can also be utilized to swing the leg quarter away from the unloader unit at a specific point of release of the leg quarter from the overhead shackle. The guide rail assembly can be a tubular or rod-like structure as shown in FIG. 4 and can have bends. The direction and angle of the bends can be designed to urge a carcass such as for example a leg quarter in a particular orientation.

The various leg quarter unloader method and apparatus examples shown above illustrate a novel method and apparatus to transfer leg quarters from an over head shackle conveyor. A user of the present invention may choose any of the above embodiments, or an equivalent thereof, depending upon the desired application. In this regard, it is recognized that various forms of the subject leg quarter unloader mechanism could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A carcass transfer unloader station comprising:
an unloader assembly having a roller chain assembly including and endless roller chain supported by a frame where the endless roller chain has a top run having an upstream top run portion and a downstream top run portion and said top run is disposed proximate an overhead shackle conveyor having a substantially level hock line along a path of conveyance; and an unloader member attached to the roller chain and extending toward the hock line to a distal end of the unloader member having an unloader shackle attached thereto, where said downstream top run portion is elevated above the upstream top run portion, whereby said unloader shackle rises above the hock line from below the hock line as the unloader shackle transverses along the downstream top run portion thereby operable to engage, retain and lift a hock of a leg quarter out of the shackle.

2. The station as recited in claim 1, further comprising a guide rail assembly having a lead in guide rail portion positioned above the upstream portion of the top run to be operable to engage a leg quarter hanging from the overhead shackle as it approaches the unloader station and shaped to urge a bottom portion of the leg quarter outward to clear the unloader member and roller chain.

3. The station as recited in claim 2 where said guide rail assembly further has a leg lift guide rail portion positioned above the top run to be operable to engage the leg quarter hanging from the overhead shackle and shaped to elevate the leg quarter upward assisting transfer from the overhead shackle to the unloader shackle.

4. The station as recited in claim 3 where said guide rail assembly further has a seating guide rail portion longitudinally aligned along a portion of the top run and along a portion of a bottom run of the roller chain and positioned sufficiently proximate said unloader member operable to urge said leg quarter toward said unloader member thereby assisting in seating said leg quarter.

5. The station as recited in claim 4 where said guide rail system further has a control guide portion longitudinally aligned along a portion of the top run and along a portion of a bottom run and positioned adjacent the roller chain to constrain movement of said leg quarter.

6. A carcass transfer unloader station comprising:
an overhead shackle conveyor having a plurality of poultry shackles suspended there from and operable to be conveyed along a path of conveyance and said poultry shackles evenly spaced a first distance apart and where the poultry shackles define a substantially level horizontal hock line along the path of conveyance at an elevation where a hock is retained;

an endless roller chain having a top run portion that extends substantially along the path of conveyance with an upward grade as the top run extends along the path of conveyance; and a plurality of unloader shackles attached to the endless roller chain and evenly space apart a second distance equidistant to the first distance and said unloader shackles extending from the roller chain toward the hock line, whereby said unloader shackle rises above the hock line from below the hock line as the unloader shackles transverses downstream along the top run thereby operable to engage, retain and lift a hock of a leg quarter hanging from a poultry shackle out of the poultry shackle.

7. The station as recited in claim 6, where said overhead shackle conveyor and said roller chain are synchronized such that each of the plurality of poultry shackles is positionally synchronized with respect to one of the plurality of unloader shackles along the top run of the roller chain.

8. The station as recited in claim 7, further comprising:
a guide rail assembly having a lift guide rail portion positioned above the top run to be operable to engage the leg quarter hanging from the poultry shackle and shaped to elevate the leg quarter upward assisting transfer from the overhead shackle to the unloader shackle.

9. The station as recited in claim 8 where said guide rail assembly further has a seating guide rail portion longitudinally aligned along a portion of the top run and along a portion of a bottom run of the roller chain and positioned sufficiently proximate said unloader shackles operable to urge said leg quarters toward said unloader shackles.

10. A carcass transfer unloader station comprising:
    an overhead shackle conveyor having a plurality of poultry shackles evenly spaced a first distance apart and suspended there from and operable to be conveyed along a path of conveyance and where the shackles define a substantially level horizontal hock line along the path of conveyance at an elevation where a hock of a leg quarter is operable to be retained;
    a roller chain mounted to convey over multiple sprockets rotatably attached by bearings to a frame and said roller chain positioned proximate the hock line and aligned longitudinally along the path of conveyance;
    a plurality of unloader shackles attached to the roller chain evenly spaced a second distance apart equidistant to the first distance.

11. The unloader station as recited in claim 10 where said multiple sprockets includes first, second and third sprockets over which the roller chain conveys where said first and second sprockets define a top run of the roller chain, where the first sprocket is upstream of the second sprocket and where said second sprocket is elevated higher than said second sprocket creating an upward slope of the top run.

12. The unloader station as recited in claim 11, where said third sprocket is vertically aligned beneath the second sprocket defining a portion of a bottom run and an unload point.

13. The station as recited in claim 12, further comprising:
    a guide rail assembly having a lead in guide rail portion position above the top run to be operable to engage a leg quarter hanging from the poultry shackle as it approaches the unloader station and shaped to urge a bottom portion of the leg quarter outward to clear the roller chain.

14. The station as recited in claim 13 where said guide rail assembly further has a leg lift guide portion positioned above the top run to be operable to engage the leg quarter and shaped to elevate the leg quarter upward assisting transfer from the poultry shackle to the unloader shackle.

15. The station as recited in claim 14, where said guide rail assembly further has a seating guide rail portion longitudinally aligned along a portion of the top run and along a portion of a bottom run of the roller chain and positioned sufficiently proximate said unloader shackles operable to urge said leg quarter toward said unloader shackle.

16. A method for transferring a carcass from an unloader shackle comprising:
    conveying a poultry shackle having a carcass retained therein on an overhead conveyor along a path of conveyance where the elevation of the lower portion of the shackle defines a hock line driving an endless roller chain, along the path of conveyance adjacent the over head conveyor where an unloader member is attached to the roller chain and extending to a distal end toward the hock line where an unloader shackle is attached to the distal end, gradually elevating the unloader member above the hock line along the path of conveyance; and
    lifting the carcass from the shackle by capturing and retaining the carcass with the unloader shackle.

17. The method as recited in claim 16 further comprising the steps of:
    engaging the carcass with a lead in guide rail and urging a bottom portion of the carcass outward with the lead in guide rail to clear the unloader member.

18. The method as recited in claim 17, further comprising the steps of:
    elevating the leg quarter upward with a leg lift guide rail.

19. The method as recited in claim 18 further comprising the steps of:
    seating the carcass in the unloader shackle with a seating guide rail.

20. The method as recited in claim 19 further comprising the steps of:
    discharging the carcass from the unloader shackle.

* * * * *